(12) United States Patent
Eisner et al.

(10) Patent No.: US 11,336,648 B2
(45) Date of Patent: May 17, 2022

(54) DOCUMENT MANAGEMENT AND COLLABORATION SYSTEM

(71) Applicant: Amazon Technologies, Inc., Seattle, WA (US)

(72) Inventors: Noah Anthony Eisner, Menlo Park, CA (US); Kevin Gillett, Seattle, WA (US); Himanshu Khurana, Seattle, WA (US); Arun Ponniah Sethuramalingam, San Jose, CA (US); Nagesh Pradhan Cadabam, Sunnyvale, CA (US); Liangliang Wang, Foster City, CA (US); Sharad Kala, Sunnyvale, CA (US); Stephen Joseph Oakley, Mountain View, CA (US); Nandhini Nandiwada Santhanam, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/077,204

(22) Filed: Nov. 11, 2013

(65) Prior Publication Data

US 2015/0134600 A1 May 14, 2015

(51) Int. Cl.
*G06F 16/93* (2019.01)
*H04L 29/06* (2006.01)
(Continued)

(52) U.S. Cl.
CPC .............. *H04L 63/10* (2013.01); *G06F 16/13* (2019.01); *G06F 16/16* (2019.01); *G06F 16/178* (2019.01);
(Continued)

(58) Field of Classification Search
None
See application file for complete search history.

(56) References Cited

U.S. PATENT DOCUMENTS 5,251,315 A 10/1993 Wang
5,577,188 A 11/1996 Zhu
(Continued)

FOREIGN PATENT DOCUMENTS

EP 1881440 A1 1/2008
JP H10240220 A 9/1998
(Continued)

OTHER PUBLICATIONS

"Portable Document Format," May 4, 2011, retrieved Jun. 13, 2019 from the Internet at: https://web.archive.org/web/20110504202116/http://en.wikipedia.org/wiki/PDF#Annotating_PDFs.*
(Continued)

*Primary Examiner* — Amresh Singh
(74) *Attorney, Agent, or Firm* — Davis Wright Tremaine LLP

(57) ABSTRACT

A method and apparatus for document collaboration and management are disclosed. In the method and apparatus, a document may be incorporated in a document directory maintained by a document collaboration and management service. A portable representation underlay based on the document may be generated using one or more asynchronous workflows and the portable representation underlay may be provided in response to a user request.

22 Claims, 9 Drawing Sheets

(51) Int. Cl.

| | | |
|---|---|---|
| *G06F 16/13* | (2019.01) | |
| *G06F 16/16* | (2019.01) | |
| *G06F 16/178* | (2019.01) | |
| *G06F 16/182* | (2019.01) | |
| *G06F 16/188* | (2019.01) | |
| *G06F 16/18* | (2019.01) | |
| *G06F 16/9535* | (2019.01) | |
| *G06F 21/62* | (2013.01) | |
| *H04L 51/04* | (2022.01) | |
| *H04L 51/42* | (2022.01) | |
| *H04L 67/02* | (2022.01) | |
| *H04L 67/306* | (2022.01) | |

(52) U.S. Cl.
CPC .......... *G06F 16/182* (2019.01); *G06F 16/183* (2019.01); *G06F 16/1873* (2019.01); *G06F 16/192* (2019.01); *G06F 16/93* (2019.01); *G06F 16/9535* (2019.01); *G06F 21/62* (2013.01); *H04L 51/04* (2013.01); *H04L 63/101* (2013.01); *H04L 63/20* (2013.01); *H04L 51/22* (2013.01); *H04L 67/02* (2013.01); *H04L 67/306* (2013.01)

(56) References Cited

U.S. PATENT DOCUMENTS

| | | |
|---|---|---|
| 5,596,754 A | 1/1997 | Lomet |
| 5,832,470 A | 11/1998 | Morita et al. |
| 5,878,398 A | 3/1999 | Tokuda et al. |
| 5,911,140 A | 6/1999 | Tukey et al. |
| 5,991,713 A | 11/1999 | Unger et al. |
| 6,088,702 A | 7/2000 | Plantz et al. |
| 6,314,425 B1 | 11/2001 | Serbinis et al. |
| 6,397,205 B1 | 5/2002 | Juola |
| 6,442,555 B1 | 8/2002 | Shmueli et al. |
| 6,505,195 B1 | 1/2003 | Ikeda et al. |
| 6,553,365 B1 | 4/2003 | Summerlin et al. |
| 6,687,876 B1 | 2/2004 | Schilit et al. |
| 6,687,878 B1 | 2/2004 | Eintracht et al. |
| 6,725,239 B2 | 4/2004 | Sherman et al. |
| 6,763,346 B1 | 7/2004 | Nishida et al. |
| 6,823,454 B1* | 11/2004 | Hind ............... H04L 29/12066 713/168 |
| 7,177,886 B2 | 2/2007 | Pruet |
| 7,757,168 B1 | 7/2010 | Shanahan et al. |
| 7,792,872 B1 | 9/2010 | Baltazar et al. |
| 7,882,110 B2 | 2/2011 | Bahr |
| 8,271,574 B1 | 9/2012 | Srinivasan et al. |
| 8,429,753 B2 | 4/2013 | Skaria et al. |
| 8,527,461 B2 | 9/2013 | Ducott et al. |
| 8,655,950 B2 | 2/2014 | Scherpa et al. |
| 8,825,502 B2 | 9/2014 | Bormann et al. |
| 8,843,494 B1 | 9/2014 | Sampson |
| 8,938,669 B1 | 1/2015 | Cohen |
| 8,996,621 B2 | 3/2015 | Kleppner |
| 9,020,893 B2 | 4/2015 | Zalpuri et al. |
| 9,047,368 B1 | 6/2015 | Cooley |
| 9,106,687 B1 | 8/2015 | Sawhney et al. |
| 9,208,153 B1 | 12/2015 | Zaveri et al. |
| 9,253,075 B2 | 2/2016 | Jacobson et al. |
| 9,270,446 B2 | 2/2016 | Ayday et al. |
| 9,400,800 B2 | 7/2016 | Jacobson et al. |
| 9,449,182 B1 | 9/2016 | Dang et al. |
| 9,508,049 B2 | 11/2016 | Lumley et al. |
| 9,536,047 B2 | 1/2017 | Ayday et al. |
| 9,600,448 B2 | 3/2017 | Balinsky et al. |
| 9,633,100 B2 | 4/2017 | Kashyap et al. |
| 9,832,195 B2 | 11/2017 | Gillett et al. |
| 9,880,989 B1 | 1/2018 | Cadabam et al. |
| 10,257,196 B2 | 4/2019 | Dang et al. |
| 2001/0042085 A1 | 11/2001 | Peairs et al. |
| 2002/0138529 A1 | 9/2002 | Yang-Stephens et al. |
| 2003/0061221 A1 | 3/2003 | Ito et al. |
| 2003/0074368 A1 | 4/2003 | Schuetze et al. |
| 2004/0068167 A1 | 4/2004 | Harik et al. |
| 2004/0205542 A1 | 10/2004 | Bargeron et al. |
| 2004/0210833 A1 | 10/2004 | Lerner et al. |
| 2004/0230577 A1 | 11/2004 | Kawatani |
| 2004/0267746 A1 | 12/2004 | Marcjan et al. |
| 2005/0010799 A1 | 1/2005 | Kelley et al. |
| 2005/0022106 A1 | 1/2005 | Kawai et al. |
| 2005/0034062 A1 | 2/2005 | Bufkin et al. |
| 2005/0038787 A1 | 2/2005 | Cheung et al. |
| 2005/0044494 A1 | 2/2005 | Barnes et al. |
| 2005/0055306 A1 | 3/2005 | Miller et al. |
| 2005/0160356 A1 | 7/2005 | Albornoz et al. |
| 2005/0240580 A1 | 10/2005 | Zamir et al. |
| 2005/0251675 A1 | 11/2005 | Marcjan et al. |
| 2005/0289127 A1* | 12/2005 | Giampaolo ............. G06F 16/14 |
| 2006/0053365 A1* | 3/2006 | Hollander ............. G06F 17/241 715/201 |
| 2006/0125846 A1 | 6/2006 | Springer et al. |
| 2006/0150079 A1 | 7/2006 | Albornoz et al. |
| 2006/0183462 A1 | 8/2006 | Kolehmainen |
| 2006/0248083 A1 | 11/2006 | Sack et al. |
| 2006/0294311 A1 | 12/2006 | Fu et al. |
| 2007/0011140 A1 | 1/2007 | King et al. |
| 2007/0118795 A1 | 5/2007 | Noyes et al. |
| 2007/0150802 A1 | 6/2007 | Wan et al. |
| 2007/0156732 A1 | 7/2007 | Surendran et al. |
| 2007/0208994 A1 | 9/2007 | Reddel et al. |
| 2007/0271249 A1 | 11/2007 | Cragun et al. |
| 2008/0040342 A1 | 2/2008 | Hust et al. |
| 2008/0052291 A1 | 2/2008 | Bender |
| 2008/0222512 A1 | 9/2008 | Albornoz et al. |
| 2009/0217158 A1 | 8/2009 | Bailey |
| 2009/0260060 A1 | 10/2009 | Smith et al. |
| 2009/0265747 A1 | 10/2009 | Li |
| 2010/0010998 A1 | 1/2010 | Wagner |
| 2010/0030578 A1 | 2/2010 | Siddique et al. |
| 2010/0095203 A1 | 4/2010 | Toebes et al. |
| 2010/0174983 A1 | 7/2010 | Levy et al. |
| 2010/0211781 A1 | 8/2010 | Auradkar et al. |
| 2010/0241668 A1 | 9/2010 | Susanto et al. |
| 2010/0318893 A1* | 12/2010 | Matthews ............. G06F 17/241 715/230 |
| 2010/0325686 A1 | 12/2010 | Davis et al. |
| 2011/0055180 A1 | 3/2011 | Lumley et al. |
| 2011/0078615 A1 | 3/2011 | Bier |
| 2011/0088091 A1 | 4/2011 | Petronijevic et al. |
| 2011/0099152 A1 | 4/2011 | Law et al. |
| 2011/0145593 A1 | 6/2011 | Auradkar et al. |
| 2011/0153680 A1 | 6/2011 | Rolla et al. |
| 2011/0178981 A1 | 7/2011 | Bowen et al. |
| 2011/0197266 A1 | 8/2011 | Chu et al. |
| 2011/0231222 A1 | 9/2011 | Sharma et al. |
| 2011/0289105 A1* | 11/2011 | Hershowitz ........... G06F 17/241 707/769 |
| 2011/0296517 A1 | 12/2011 | Grigoriev et al. |
| 2011/0302210 A1 | 12/2011 | Comanescu |
| 2011/0320925 A1 | 12/2011 | Piersol et al. |
| 2012/0011216 A1* | 1/2012 | Zuber ..................... G06F 16/93 709/206 |
| 2012/0030553 A1 | 2/2012 | Delpha et al. |
| 2012/0086989 A1 | 4/2012 | Collins et al. |
| 2012/0136936 A1 | 5/2012 | Quintuna |
| 2012/0192086 A1* | 7/2012 | Ghods ................... G06Q 10/10 715/753 |
| 2012/0198457 A1 | 8/2012 | Leonelli et al. |
| 2012/0222132 A1 | 8/2012 | Burger et al. |
| 2012/0284605 A1 | 11/2012 | Sitrick et al. |
| 2012/0323968 A1 | 12/2012 | Yih et al. |
| 2013/0013560 A1* | 1/2013 | Goldberg .......... G06F 17/30174 707/634 |
| 2013/0061125 A1 | 3/2013 | O'Mara et al. |
| 2013/0104028 A1 | 4/2013 | Murray et al. |
| 2013/0151970 A1 | 6/2013 | Achour |
| 2013/0191451 A1 | 7/2013 | Tse et al. |
| 2013/0215469 A1* | 8/2013 | Pizot ..................... H04N 1/0023 358/1.15 |
| 2013/0219176 A1 | 8/2013 | Akella et al. |
| 2013/0246901 A1 | 9/2013 | Massand |

(56) References Cited

U.S. PATENT DOCUMENTS

| | | | |
|---|---|---|---|
| 2013/0311420 A1 | 11/2013 | Tehranchi et al. | |
| 2014/0026025 A1 | 1/2014 | Smith | |
| 2014/0032633 A1* | 1/2014 | Kleppner | G06F 40/169 709/202 |
| 2014/0074905 A1 | 3/2014 | Schincariol et al. | |
| 2014/0089775 A1 | 3/2014 | Worsley et al. | |
| 2014/0101310 A1 | 4/2014 | Savage et al. | |
| 2014/0115436 A1 | 4/2014 | Beaver et al. | |
| 2014/0115450 A1 | 4/2014 | Zhong et al. | |
| 2014/0143446 A1 | 5/2014 | Jacobson et al. | |
| 2014/0173137 A1 | 6/2014 | Jacobson et al. | |
| 2014/0196115 A1 | 7/2014 | Pelykh | |
| 2014/0229556 A1 | 8/2014 | Cooper et al. | |
| 2014/0250073 A1 | 9/2014 | Zalpuri et al. | |
| 2014/0280848 A1 | 9/2014 | Modh et al. | |
| 2014/0281875 A1 | 9/2014 | Branton et al. | |
| 2014/0282921 A1 | 9/2014 | Filman et al. | |
| 2014/0351907 A1 | 11/2014 | Noble | |
| 2015/0067150 A1 | 3/2015 | Heredia et al. | |
| 2015/0106378 A1 | 4/2015 | Clark et al. | |
| 2015/0134600 A1 | 5/2015 | Eisner et al. | |
| 2015/0169500 A1 | 6/2015 | Balinsky et al. | |
| 2015/0199379 A1 | 7/2015 | Thierer et al. | |
| 2015/0199416 A1 | 7/2015 | Kashyap et al. | |
| 2015/0227514 A1 | 8/2015 | Gillett et al. | |
| 2015/0236849 A1 | 8/2015 | Ayday et al. | |
| 2016/0156631 A1 | 6/2016 | Viswanathan et al. | |
| 2016/0224735 A1 | 8/2016 | Ayday et al. | |
| 2018/0004828 A1 | 1/2018 | Kathuria et al. | |
| 2018/0004829 A1 | 1/2018 | Kathuria et al. | |
| 2018/0097812 A1 | 4/2018 | Gillett et al. | |
| 2018/0375730 A1 | 12/2018 | Anand et al. | |
| 2019/0014395 A1 | 1/2019 | Anand et al. | |

FOREIGN PATENT DOCUMENTS

| | | |
|---|---|---|
| JP | 2003067330 A | 3/2003 |
| JP | 2005228253 A | 8/2005 |
| JP | 2007501969 A | 2/2007 |
| JP | 2009086742 A | 4/2009 |
| JP | 2010034920 A | 2/2010 |
| JP | 2011191862 | 9/2011 |
| JP | 2012209809 A | 10/2012 |
| KR | 20100080802 A | 7/2010 |
| KR | 20110000655 A | 1/2011 |
| KR | 101159504 B1 | 6/2012 |
| KR | 20140092831 A | 7/2014 |
| WO | 2009105735 A2 | 8/2009 |

OTHER PUBLICATIONS

M. Miller, "End-to-End Object Encryption and Signatures for the Extensible Messaging and Presence Protocol (XMPP)," Jun. 13, 2013, retrieved Feb. 1, 2021 from https://tools.ietf.org/id/draft-miller-xmpp-e2e-06.html (Year: 2013).*
U.S. Appl. No. 14/077,195, filed Nov. 11, 2013.
U.S. Appl. No. 14/077,201, filed Nov. 11, 2013.
U.S. Appl. No. 14/077,209, filed Nov. 11, 2013.
U.S. Appl. No. 14/077,210, filed Nov. 11, 2013.
Eppstein et al., "What's the Difference? Efficient Set Reconciliation Without Prior Context?", SIGCOMM '11, Toronto Ontario, Canada, Aug. 15-19, 2011, 12 pages.
International Search Report and Written Opinion dated Mar. 31, 2015, in International Patent Application No. PCT/US2014/64875, filed Nov. 10, 2014.
International Search Report and Written Opinion dated Aug. 28, 2015, International Patent Application No. PCT/US2015/014911, filed Feb. 6, 2015.
"Extended European Search Report, dated Oct. 27, 2017," European Patent Application No. 14859862.6, filed Nov. 10, 2014, 12 pages.
"Notice of acceptance for patent application dated Nov. 17, 2017," Australian Patent Application No. 2014346473, filed Nov. 10, 2014, 3 pages.
"Decision of Patent Grant dated Oct. 2, 2017," Korean Patent Application No. 10-2016-7015415, filed Nov. 10, 2014, four pages.
Kong et al., "Graphical Overlays: Using Layered Elements to Aid Chart Reading," IEEE Transactions on Visualization and Computer Graphics 18(21): 2631-2638, published online Oct. 9, 2012, print publication Dec. 1, 2012.
Japanese Final Rejection dated Mar. 26, 2018, Patent Application No. 2016-528236, filed Nov. 10, 2014, 4 pages.
Canadian Office Action dated Jun. 28, 2018, Patent Application No. 2930415, filed Nov. 10, 2014, 4 pages.
Doi et al., "A proposal of an Annotation System CollabSticky Focused on Collecting Comments in Presentation," Information Processing Society of Japan 2007(1):159-164, Jul. 2007.
He et al., "RIDEE-SPS: Presentation System for Realtime Interactive Distance Education Environment," Information Processing Society of Japan 44(3):700-708, Mar. 15, 2003.
Japanese First Office Action dated Oct. 15, 2018, Patent Application No. 2018-138930, filed Nov. 10, 2014, 4 pages.
Fujita et al., "Comprehensive Manual for Editing and Publishing Books for Amazon Kindle (p. 162)," MD Corporation, Inc., Jul. 21, 2013, 4 pages.
Japanese Final Rejection dated Mar. 4, 2019, Patent Application No. 2018-138930, filed Nov. 10, 2014, 3 pages.
Japanese Office Action dated Mar. 25, 2019, Patent Application No. 2016-528236, filed Nov. 10, 2014, 17 pages.
Chinese First Office Action dated Dec. 3, 2018, Patent Application No. 201480072858.7, filed Nov. 10, 2014, 8 pages.
Singaporean Notice of Eligibility for Grant and Supplementary Examination Report dated Dec. 24, 2018, Patent Application No. 11201603644X, filed Nov. 10, 2014, 3 pages.
Canadian Office Action dated Jul. 2, 2020, Patent Application No. 2930415, 3 pages.
Canadian Office Action dated Jun. 4, 2019, Patent Application No. 2930415, filed Nov. 10, 2014, 3 pages.
Chinese Notice of Grant dated Oct. 9, 2019, Patent Application No. 201480072858.7, filed Nov. 10, 2014, 4 pages.
Chinese Second Office Action dated Jun. 18, 2019, Patent Application No. 201480072858.7, filed Nov. 10, 2014, 3 pages.
Einziger et al., "TinySet—An Access Efficient Self Adjusting Bloom Filter Construction," IEEE/ACM Transactions on Networking 25(4):2295-2307, Aug. 2017.
Eppstein et al., "Straggler identification in round-trip data streams via Newton's identities and invertible Bloom filters," IEEE Transactions on Knowledge and Data Engineering 23(2):297-306, Aug. 19, 2010.
European Communication under Rule 71(3) EPC dated Jun. 7, 2019, Patent Application No. 14859862.6, filed Nov. 10, 2014, 48 pages.
Extended European Search Report dated Jan. 24, 2020, Patent Application No. 19204178.8, filed Nov. 10, 2014, 9 pages.
Goodrich et al., "Invertible Bloom Lookup Tables," 49th Annual Allerton Conference on Communication, Control, and Computing, Sep. 28, 2011, 24 pages.
Indian First Examination Report dated May 11, 2020, Patent Application No. 201647018749, 8 pages.
Japanese Appeal Decision (Decision to Grant) dated Oct. 27, 2020, Patent Application No. 2018-138930, 23 pages.
Japanese Appeal Decision dated Oct. 28, 2019, Patent Application No. 2016-528236, filed Nov. 10, 2014, 23 pages.
Japanese Office Action dated Jun. 1, 2020, Patent Application No. 2018-138930, 4 pages.
European Communication pursuant to Article 94(3) EPC dated Jun. 14, 2021, Patent Application No. 19204178.8, 5 pages.

* cited by examiner

DOCUMENT MANAGEMENT AND COLLABORATION SYSTEM

CROSS-REFERENCE TO RELATED APPLICATIONS

This application incorporates by reference for all purposes the full disclosure of: co-pending U.S. patent application Ser. No. 14/077,195, filed concurrently herewith, entitled "HOMOGENOUS CAPTURE OF DOCUMENT INTERACTIONS," co-pending U.S. patent application Ser. No. 14/077,201, filed concurrently herewith, entitled "CROSS-PLATFORM HOMOGENOUS DOCUMENT COLLABORATION," co-pending U.S. patent application Ser. No. 14/077,209, filed concurrently herewith, entitled "PROCESSING SERVICE REQUESTS FOR NON-TRANSACTIONAL DATABASES," and co-pending U.S. patent application Ser. No. 14/077,210, filed concurrently herewith, entitled "DOCUMENT VERSION CONTROL IN COLLABORATIVE ENVIRONMENT."

BACKGROUND

The use of remote computing services, such as remote document storage, has greatly increased in recent years. An organization, for example, may support its operations using both internal networks of computing resources and computing resources managed by others. Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially given the multitude of different computing systems. For example, computers of the organization may include Personal Computers, Tablets, Smartphones, Laptops and other devices.

Ensuring that users can share and collaborate on documents is challenging given the variety of hardware and software components of different devices. Furthermore, it is challenging to ensure that user requests are timely processed and that back-end systems are updated in a manner that ensures overall system consistency.

BRIEF DESCRIPTION OF THE DRAWINGS

Various embodiments in accordance with the present disclosure will be described with reference to the drawings, in which.

DETAILED DESCRIPTION

Figure 1:
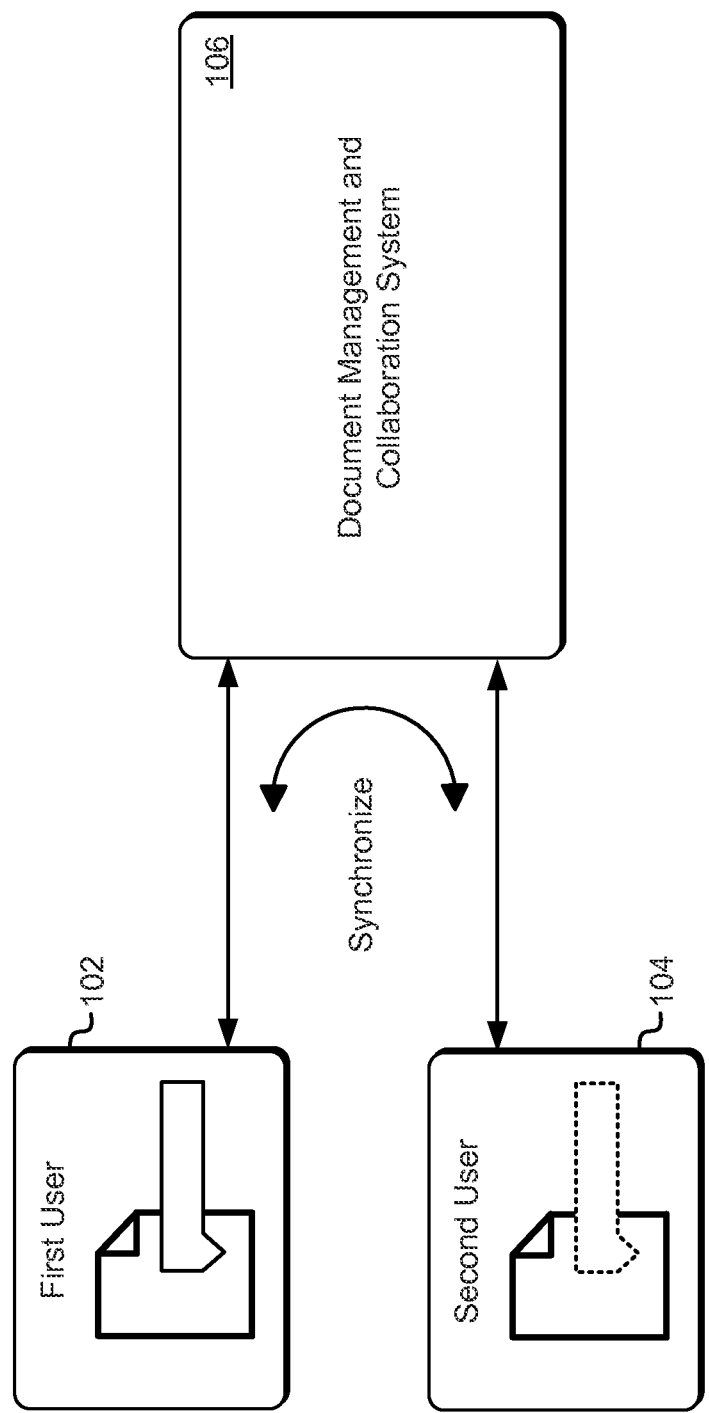
FIG. 1 shows an example of document sharing and collaboration in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include utilizing a document management and collaboration system to enable users to share documents and collaborate on the documents. The users may be part of a group of users or an organization that maintains a document directory managed by the document management and collaboration system. A user may have permission privileges to the directory or any of the directories associated folders or subfolders. The permission privileges may permit the user to view, change or annotate documents. The permission privileges may further permit the user to comment on or provide feedback on documents and create or delete documents or folder. There may be various levels or permission or sharing privilege and users' privileges may vary.

Actions performed by one user on the directory or a document may be perceived and viewed by a second user or collaborator. As described herein, each user device may be capable of communicating with the document management and collaboration system in order to take actions or make changes to a directory or document. The document management and collaboration system may, in turn, cause changes that are made by a first user to be propagated to a second user such that the second user may have a view that is consistent with the first user. It is noted that exchanges between the document management and collaboration system and users may be performed using API configured calls.

The document management and collaboration system may utilize a variety of services to enable document sharing and collaboration. The document management and collaboration system may utilize various databases for storing document metadata, such as a document version, storage location or size, or user of group permissions for accessing documents or folders, among other types of metadata. Further, the document management and collaboration system may utilize storage services for storing documents in various forms, such as an originally uploaded document in its native file format or an underlay in a portable representation format that may be rendered for viewing on user devices, among other uses. The portable representation format may be a common format (also referred to herein as a universal format) that user devices are capable of processing and rendering, for example, without the need for expensive or computationally intensive standard productivity suites. User devices that interact with the document management and collaboration system may be capable of reading or processing the common and causing underlay having the format to be rendered. The document management and collaboration system may further utilize a workflow service that is capable of executing or causing the execution of workflows. As described herein, a workflow may be a set or a group of operations or tasks whose execution may be coordinated and their dependencies may be managed. Further, a workflow may be used for executing processing steps and structuring the processing steps in a manner that is failure-resilient and that may be audited.

To improve user experience and minimize user-perceived delays, the document management and collaboration system may utilize synchronous-to-asynchronous handoff in processing requests. Upon receipt of a request, the document management and collaboration system may cause the execution of some operations synchronously and schedule the execution of remaining operations asynchronously (for example, using asynchronous workflows). Accordingly, only a minimal amount of delay may be experienced by a user due to the execution of the synchronous operations, whereas computationally intensive operations may be offloaded and performed using asynchronous workflows.

FIG. 1 shows an example of document sharing and collaboration in accordance with at least one embodiment. A first user 102 and a second user 104 are connected to a document management and collaboration system 106. The document management and collaboration system 106 enables the users to share documents and collaborate on the documents. Further, the document management and collaboration system 106 enables the two users to be synchronized such that texts, commentaries, annotations or highlighting that are provided by the first user 102 may be viewed by the second user. Synchronization between users may be performed real-time or semi-continuously, periodically or may be event-driven or event-triggered, whereby the event may be any type of user command, such as storing a document under collaboration. As described herein, the term "user" may refer to a human-operated computing device that is equipped with communication and computing capability.

The term "document" may be any type of media, such as audio-visual media, that is capable of being rendered on a computing device. A document may be a computer files that are capable of being produced by or edited or viewed using a productivity program or suite. Accordingly, the document may be editable or non-editable text, images, drawings and websites, among others. In addition to enabling users to collaborate and share documents, the document management and collaboration system may provide the users with file systems or organizational structures to manage the documents. The organizational structures may include directories having nested folders and subfolders of documents and may be accessible to the users and utilized by the user as a way to access documents.

Figure 2:
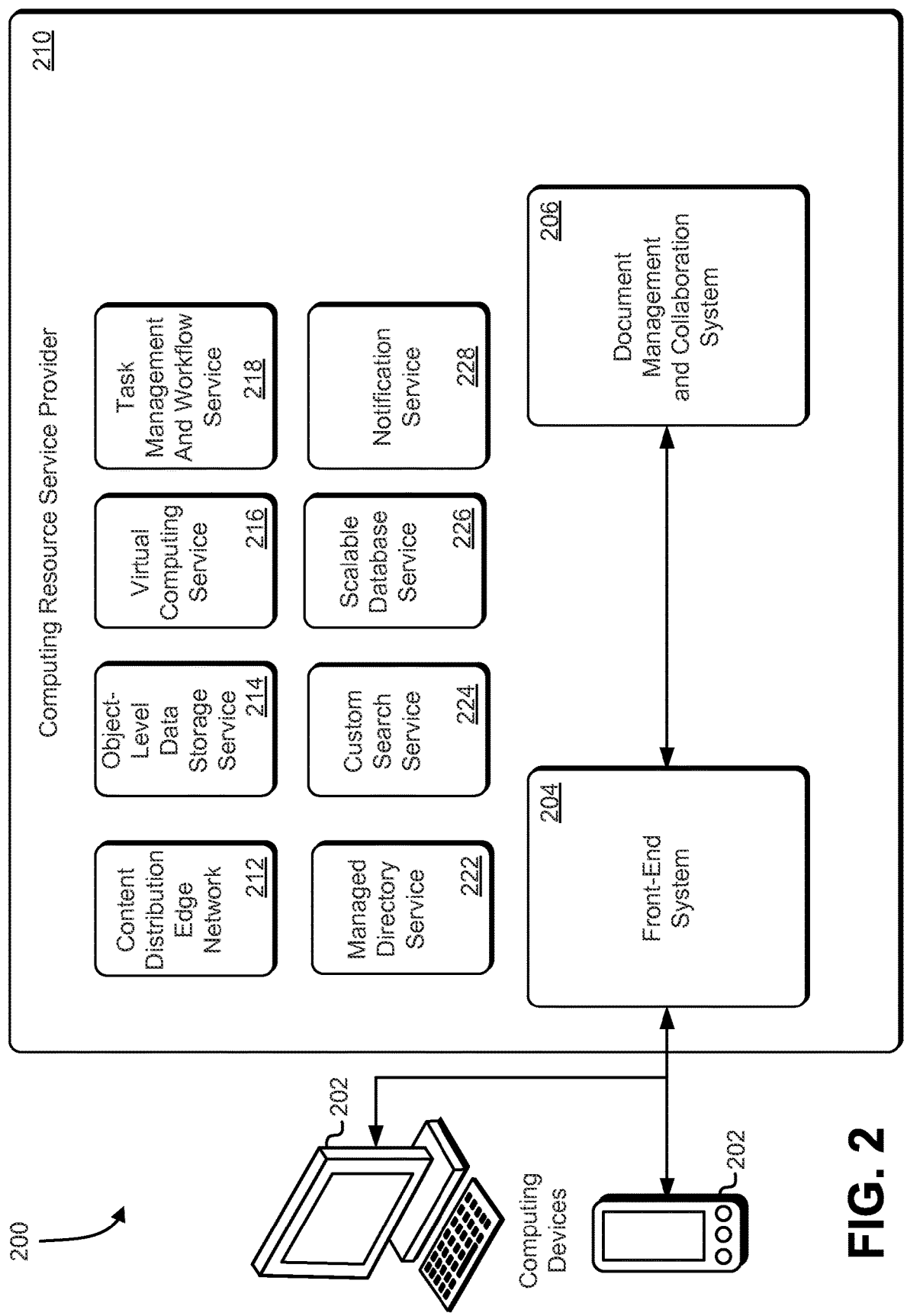
FIG. 2 shows an example of computing devices connected to a computing resource service provider in accordance with at least one embodiment.

FIG. 2 shows an example of computing devices connected to a computing resource service provider in accordance with at least one embodiment. The computing devices 202 may be any device that is capable of communicating with the computing resource service provider 210 or its entities. The computing devices 202 may also be equipped with local or remote (for example, network-based) computational and storage capabilities. The computational capabilities may be provided or enabled by a processor, such as a central processing unit (CPU), graphics processing unit (GPU), digital signal processor and the like. Examples of CPUs include CPUs that employ an x86 architecture (for example, as used in desktop and laptop computing devices) or a reduced instruction set computing (RISC) architecture (for example, as used in smartphone and tablet computing devices). The computing devices 202 may also be equipped with communications and networking hardware and may be capable of communicating using any communications protocol. Further, the computing devices 202 may be equipped with input/output devices that may include a display, a touch screen-based or keyboard-based input device or speakers. Additionally, the computing devices may include any type of memory, such as static or dynamic memory, and a power source or a power adapter. Aside from their hardware capability, the computing devices 202 may be configured to run or execute an operating system and/or other programs and the computing devices' 202 associated memory may store executable instructions that, when executed by one or more processor, cause one or more functions to be performed or cause the operating system and/or other programs to run. Although two devices are shown in FIG. 2, any number of devices may be contemplated in various embodiments. Further, the computing devices 202 may communicate with the computing resource service provider 210 or any entity of the computing resource service provider 210 via a network (not shown). The network may be public or private, whereby examples of the network include the Internet and an Internet service provider (ISP) network.

The computing devices 202 may collectively or individually be associated with a user or a customer of the computing resource service provider 210 or its entities and functions. The customer may be an organization that may utilize one or more of the services provided by the computing resource service provider 210 to maintain and deliver information to its employees, which may be located in various geographical locations. Additionally, the customer may be an individual that utilizes the services of the computing resource service provider 210 to deliver content to a working group located remotely.

The computing resource service provider 210 includes a front-end system 204 and a file management and collaboration system 206 as well as plurality of services and systems as shown in FIG. 2. These include a content distribution edge network 212, an object-level data storage service 214, a virtual computing service 216, a task management and workflow service 218, a managed directory service 222, a custom search service 224, a scalable database service 226 and a notification service 228. It is noted that in various embodiments, the computing resource service provider 210 may include fewer services and systems than those described with references to FIG. 2 or may include additional or alternative services or systems to those described with reference to FIG. 2. Further, in alternative embodiments, the systems and services may be utilized outside the context of the computing resources service provider 210. For example, the services and systems may be stand-alone or used in conjunction with systems and services other than those described with reference to FIG. 2.

The front-end system 204 may be a gateway to the file management and collaboration system 206 and may offer private and public services to user or customer and their computing devices 202. Access to the front end system 204 may require authorization or user authentication. In addition, a device or user privilege level may govern access to the front-end system 204 and any data exchanges between the front-end system 204 and the computing devices 202. Access to the front-end system 204 may be governed by a privilege level associated with a computing device 202 or a privilege level or credential given to the computing device 202 or a user of the computing device 202, for example, by a group or organization administrator.

The front-end system 204 may perform authentication of a customer, a user or a device before granting access to the resources of the file management and collaboration system 206. The authentication may be based on credentials, such as username and password information, or access tokens, among others. The front-end system 204 may provide services and interfaces that permit or enable customer access. For example, the front-end system 204 may enable a web-based platform or a console-based platform that provides information related to the services of the computing resource service provider 210 to the customer. Further, the front-end system 204 may enable the customer to execute applications or tasks in the computing resource service provider 210, track and manage the execution of the applications or tasks and receive the results of the execution and transmit the results to user devices. As further described herein, the front-end system 204 may be the gateway by which the customer or its associated devices 202 may utilize the plurality of services provided by the computing resource service provider 210.

The document management and collaboration system 206 enables and manages the execution and processing of documents for collaboration between one or more users in a distributed system. The document management and collaboration system 206 may, for example, enable uploading documents to the computing resource service provider 210 and retaining and modifying metadata associated with the documents. The document management and collaboration system 206 may further allow for search functions associated with the documents or their metadata as well as collaborations between users on the documents.

Although the term "document" is used herein to describe objects produced or collaborated on by users of the computing resource service provider 210, the term "document" is not limited to media, such as audio-visual media. A document may be computer files that are capable of being produced by or edited or viewed using a productivity program or suite. Accordingly, the document may be editable or non-editable text, images, drawings and websites, among others.

The content distribution edge network 212 of the computing resource service provider 210 may be a collection of computing devices and other resources collectively configured to deliver content, such as web content, to a plurality of users. The content distribution edge network 212 may have a plurality of edge locations, for example, that are distributed in world-wide locations that are strategically placed to optimize user data throughput and minimize latency. The content distribution edge network 212 may receive requests for content and deliver the requested content to users. The content distribution edge network 212 may interface with a storage service that stores a portion or all of the content and may cause the content to be retrieved and provided to a requesting party. The content distribution edge network 212 may be utilized to enable user-accessible websites or web applications of the front-end system 204.

The object-level data storage service 214 may be a collection of computing resources configured to synchronously process requests to store and/or access data. The object-level data storage service 214 may operate using computing resources (e.g., databases) that enable the object-level data storage service 214 to locate and retrieve data quickly, so as to allow data to be provided in responses to requests for the data. For example, the object-level data storage service 214 may maintain stored data in a manner such that, when a request for a data object is retrieved, the data object can be provided (or streaming of the data object can be initiated) in a response to the request. As noted, data stored in the object-level data storage service 214 may be organized into data objects. The data objects may have arbitrary sizes except, perhaps, for certain constraints on size. Thus, the object-level data storage service 214 may store numerous data objects of varying sizes. As described herein, the object-level data storage service 214 may store any type of document (for example, document source files), underlays, previews, thumbnails, extracted document text, annotation indices or truth tables.

The virtual computing service 216 may be a collection of computing resources configured to instantiate virtual machine instances on behalf of an entity of the computing resource service provider 210 (such as the document management and collaboration system 206) or on behalf of a customer. A party may interact with the virtual computing service 216 (via appropriately configured and authenticated API calls) to provision and operate virtual computer systems that are instantiated on physical computing devices hosted and operated by the virtual computing service 216. The virtual computer systems may be used for various purposes, such as to operate as servers supporting a website, to operate business applications or, generally, to serve as computing power. Further, the virtual computer systems may be used to support database applications, electronic commerce applications, business applications and/or other applications. Although the virtual computing service 216 is shown in FIG. 2, any other computer system or computer system service may be utilized, such as a computer system or computer system service that does not employ virtualization or instantiation and instead provisions computing resources on dedicated or shared computers/servers and/or other physical devices.

The task management and workflow service 218 may be a collection of computing devices and other resources collectively configured to perform task coordination and management services that enable executing computing tasks across a plurality of computing environments and platforms. The task management and workflow service 218 tracks the progress of workflow execution and performs the dispatching and holding of tasks. Further, the task management and workflow service 218 may control the assignment of hosts or physical or virtual computing machines used for executing the tasks. A user may define a workflow for execution, whereby the workflow may include one or more tasks. The workflow may be defined using an application programming interface (API) configured function call to the task management and workflow service 218. Further, the user may specify task order for the workflow, conditional flows and timeout periods for restarting or terminating the execution of the workflow. In addition, execution loops for the workflow may be defined. As described herein, workflow execution may by asynchronous and may be preceded by synchronous execution of database writes.

The managed directory service 222 may be a collection of computing devices and other resources collectively configured to serve as a directory that enables users to log on to computing resources of the computing resource service provider 210 using one set of credentials and to enable administrators to uniformly apply security policies to the computing resource service provider 210. The managed directory service 222 may enable a web-based console for user and group management and may be used as an authentication system for user credentials.

The custom search service 224 may be a collection of computing devices and other resources collectively configured to permit customized searches of data sets and enable establishing security or authentication requirements on a party performing a search. Further, the custom search service 224 allows for data set replication to enable consistent performance in the case of outages. As described herein, the custom search service 224 may be utilized for maintaining a search index of customer documents and their associated metadata. Further, to ensure consistent performance the searchable metadata or customer documents may be replicated to ensure consistent performance and guard against outages.

The scalable database service 226 may be a collection of computing devices and other resources collectively configured to provide a structured storage system that facilitates the storage and retrieval of documents or data. The scalable database service 226 may be non-relational and may be based on a key-value model. Examples of the scalable database service 226 include a NoSQL database (for example, to be distinguished from a relational structured query language (SQL) database). The scalable database service 226 may be used to store metadata associated with documents or users. For example, the scalable database service 226 may store metadata for underlays, overlays, documents, feedback or comments. In addition, the scalable database service 226 may store metadata associated with users, organizations and permissions. As a non-relational database, the scalable database service 226 may guarantee atomic writes to a single item in a single table. Accordingly, a single write may be synchronously performed to a truth table and remaining writes may be performed asynchronously using workflows.

In the environment illustrated in FIG. 2, a notification service 228 is included. The notification service 228 may comprise a collection of computing resources collectively configured to provide a web service or other interface and browser-based management console. The management console can be used to configure topics for which customers seek to notify applications (or people), subscribe clients to the topics, publish messages, or configure delivery of the messages over clients' protocol of choice (i.e., hypertext transfer protocol (HTTP), e-mail and short message service (SMS), among others). The notification service 228 may provide notifications to clients using a "push" mechanism without the need to periodically check or "poll" for new information and updates. The notification service 228 may further be used for various purposes, such as monitoring applications that are being executed in the virtual computing service 216, workflow systems, time-sensitive information updates, mobile applications, and many others.

Figure 3:
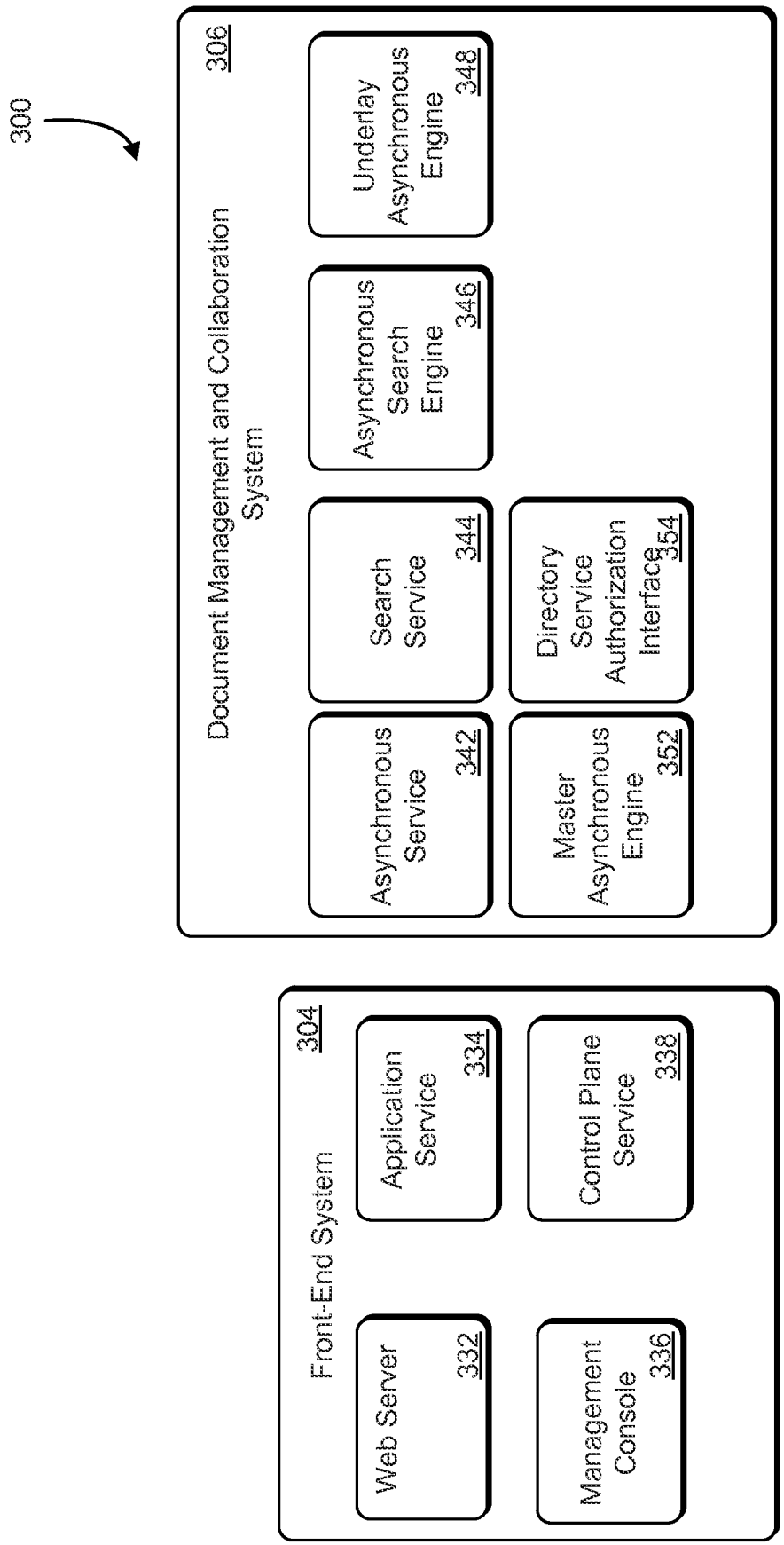
FIG. 3 shows the functional entities of the front-end system and the document management and collaboration system in accordance with at least one embodiment.

FIG. 3 shows the functional entities of the front-end system and the document management and collaboration system in accordance with at least one embodiment. The front-end system 304 includes a web server 332, an application service 334, a management console 336 and a control plane service 338. The web server 332 may enable the execution of a web site, a single-page web application or a single-page interface that permits a user to transmit or upload documents to the document management and collaboration system 306 and manage the documents. The web server may further enable the user to view and edit documents, underlays or overlays and provide commentary or feedback on the documents, underlays or overlays. The web server 332 may also enable an administrator or a user to set permissions or share modes that specify the privileges given to a user in accessing documents. In addition, the web server may enable users or devices to submit authentication or authorization credentials. The content distribution edge network, described with reference to numeral 212 in FIG. 2, may be used to distribute content of the web server 332. The actions performed by the user may be done via a website, an application or a management console and the web server 332 may enable executing the website, application or management console. Although one web server 332 is described with reference to FIG. 3, it may be contemplated that multiple web servers of any type may be used, whereby a portion of the web servers may be redundant.

The application service 334 may be a collection of computing devices and other resources collectively configured to serve as a user-exposed service that receives requests from the user and services the requests. A user request may be made using a website or a management console accessible to the user or a client that is executed on a user's device may make service requests on behalf of the user. The request may be an API function call and the application service 334 may process the request and manage its execution. The application service 334 may cause the synchronous execution of actions associated with a received request or alternatively may cause one or more actions that require more complex processing to be queued for asynchronous execution. The application service 334 may also be responsible for receiving user credentials and request authentication of the user from an authentication service. To cause the performance of operations requested by the user, the application service 334 may make one or more function calls to services or entities of the computing resource service provider 210. For example, the application service 334 may request user or access token validation from the managed directory service 222 or may cause search indices maintained by the custom search service 224 to be updated.

The management console 336 may be a collection of computing devices and other resources collectively configured to permit organizations, administrators and users to register for utilizing document management and collaboration services. The management console 336 may be used in addition or as an alternative to a website or an application running on a user device and may permit users and administrators to make service requests using appropriately configured API function calls. For example, the management console 336 may be used for inviting a user to join a document collaboration system and view and collaborate on documents. Further, the management console 336 may be used for allowing dashboard access, audit log access, permission setting (for example, for administrators and user), storage limit setting (for example, for organizations and users) and security setting (for example, password and encryption).

The control plane service 338 of the front-end system 304 may be a collection of computing devices and other resources collectively configured to serve as an interface that enables creating new computing instances for document collaboration and management. Instances may be created by transparently creating a directory in the managed directory service 222 or associating an existing directory (for example, maintained by the managed directory service 222 or by a user or administrators) for document management and collaboration. The control plane service 338 may be utilized to create a document directory and the document directory may be executed and served by the managed directory service 222. The document directory may be associated with an organization having an administrator that is capable of providing permissions and privileges to users. Following the creation of the directory, the application service 334 may be used to enable functions affecting folders or documents of the directory.

The document management and collaboration system includes an asynchronous service 342, a search service 344, an asynchronous search service 346, an underlay asynchronous service 348, a master asynchronous engine 352 and a directory service authorization interface 354. The asynchronous service 342 may be a collection of computing devices and other resources collectively configured to manage the execution of asynchronous workflows. The asynchronous service 342 may include or be connected to a queue that stores asynchronous events for execution. The asynchronous service 342 may coordinate the execution of asynchronous workflows with the master asynchronous engine 352, which may be responsible for scheduling activities associated with the workflow. The activities may include underlay generation and text extraction. As described herein, the execution of workflow activities or tasks may be performed by engines or workers. For example, the asynchronous search engine 346 may be tasked with performing text extraction activities and the underlay asynchronous engine 348 may be tasked with performing activities associated with underlay creation.

In the course of executing asynchronous workflows, the asynchronous search engine 346 and the underlay asynchronous engine 348 may obtain or download documents or files from the object-level data storage service 214 and cause documents or files to be stored in the object-level data storage service 214. Further, the engines may generate documents of any file type based on received documents, perform text extraction and store annotations. In addition, the asynchronous search engine 346 may place search index updates associated with document in a queue for processing by the search service 344. The updates may be associated with search indices maintained by the custom search service 224 described with reference to FIG. 2 herein.

The search service 344 may be a collection of computing devices and other resources collectively configured to perform batch processing on the search index updates in the queue and launch a workflow for performing search index update activities. Upon launching the workflow, the asynchronous search engine 346 causes search indices to be updated in the custom search service 224. The directory service authorization interface 354 enables the document management and collaboration system 306 to delegate user authentication to another entity such the managed directory service described with reference to numeral 222 in FIG. 2. The document management and collaboration system 306 may submit user access tokens to the authenticating party via the directory service authorization interface 354 and may receive a response indicating whether a user may be authenticated.

Figure 4:
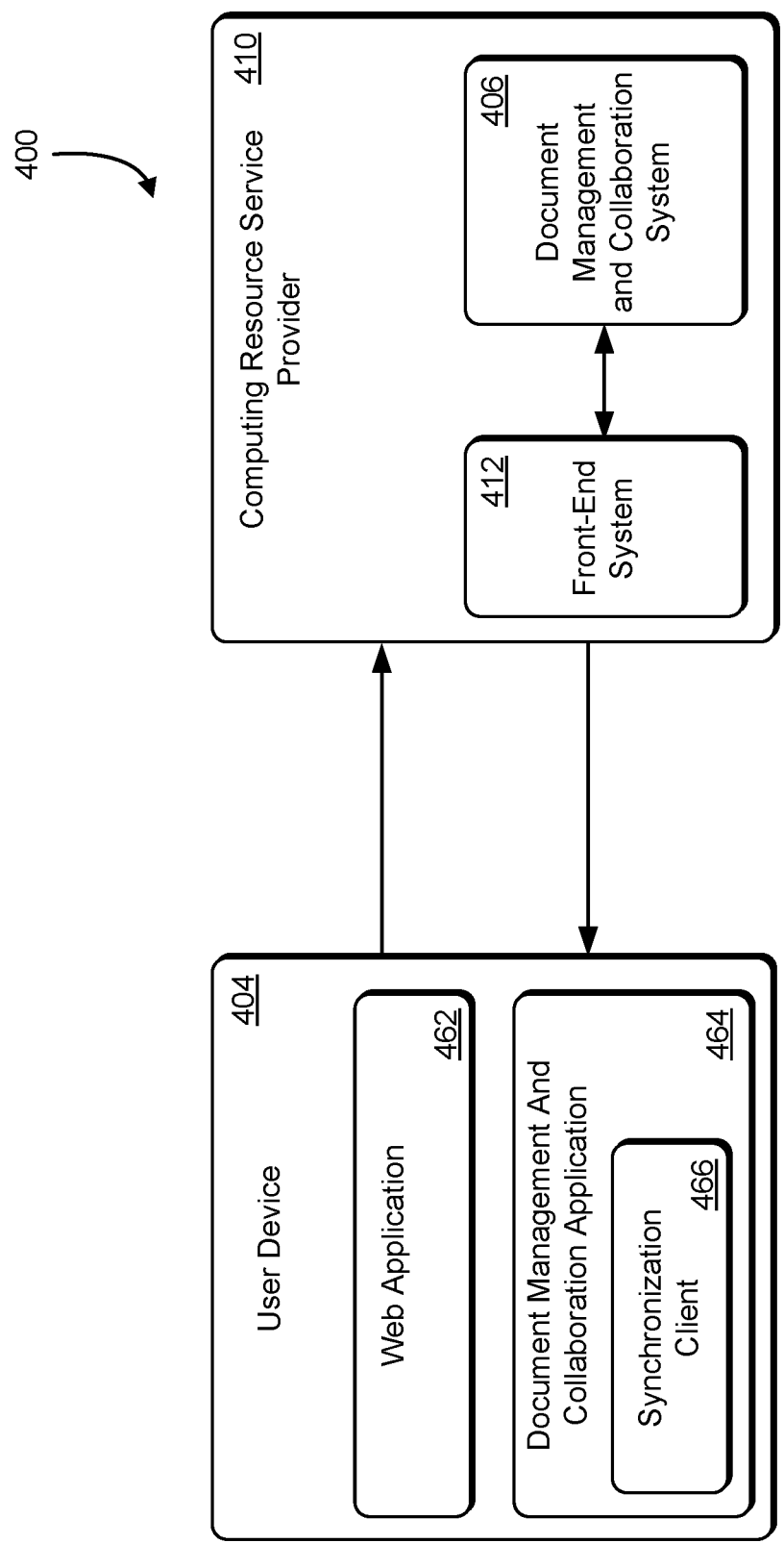
FIG. 4 shows a user device in communication with a computing resource service provider having a document management and collaboration system in accordance with at least one embodiment.

FIG. 4 shows a user device in communication with a computing resource service provider having a document management and collaboration system in accordance with at least one embodiment. In the environment 400, the user device 404 includes a web application 462 and a document management and collaboration application 464 that is equipped with a synchronization client 466. The computing resource service provider 410 includes a document management and collaboration system 406, such as the document management and collaboration system described with reference to numeral 306 in FIG. 3. It is noted that the computing resource service provider 410 may include entities in addition to or in place of those shown in FIG. 4, such as the entities described with reference to FIGS. 2 and 3.

As described herein, the user device 404 may be equipped with a collection of computing devices and other resources collectively configured to communicate with the computing resource service provider 410 or any one of its entities. The user device 404 may be equipped with any number or type of communication devices, such as ports or modems that enable any type of wireless or wired connectivity. Further, the communication may be performed over any type of network (not shown) such as Internet protocol (IP) networks including the Internet, an intranet or an Internet service provider (ISP) network. In addition, the user device 404 may communicate in accordance with or in compliance with any type of communications protocol including any one of the Institute for Electrical and Electronics Engineers (IEEE) 802 protocols, a short range communications protocol, such as Bluetooth™, or a cellular communications protocol, such as a third generation (3G) communications protocol or long term evolution (LTE).

The web application 462 may enable the user device 404 to render and cause the display of a website and interact with the website. Examples of the web application 462 include a web browser and the web application 462 may permit a user to supply log in credentials to a document collaboration and management website and access one or more document directories of folders. Further, the web application 462 may enable the user, for example, via a website, to navigate between folders or directories for which the user has at least viewing privileges, for example, based at least in part on the user's credentials. In addition, the web site may provide the user with the option of uploading or transmitting a document to be included in a folder or to be shared, commented upon or annotated by the user or one or more other collaborators. Further, the web application 462 enables the user to select any one of a plurality of versions of a document and view a generated underlay associated with the document version, an overlay showing users annotations or an originally uploaded document in native file format. It is noted that the underlay and the overlay may be of a different file format than the originally uploaded document. Reference is made herein to co-pending U.S. patent application Ser. No. 14/077,195, filed concurrently herewith, entitled "HOMOGENOUS CAPTURE OF DOCUMENT INTERACTIONS," and co-pending U.S. patent application Ser. No. 14/077,201, filed concurrently herewith, entitled "CROSS-PLATFORM HOMOGENOUS DOCUMENT COLLABORATION" describing, among others, overlay and underlay generation.

Action performed by the user in interacting with a website may cause the web application 462 to send requests to the computing resource service provider 410 or its entities. The requests may be application programming interface (API) function calls that are executed by the computing resource service provider 410. For example, when a user annotates a document version and saves the annotated version, the web application 462 may cause an API function call to be made that indicates the annotations to the computing resource service provider 410 or its entities. In some embodiments, the web application 462 may not be fully synchronous and may not cause a request to be made based on any action taken by the user. For example, as the user annotates a document the web application 462 may not relay the annotations synchronously as they are made by the user and may instead only relay the annotations when the user saves the document or the annotations or, alternatively, every time interval.

As shown in FIG. 4, the user device 404 is further equipped with a document management and collaboration application 464. The document management and collaboration application 464 may be executable instructions (for example, that are stored on a non-transitory computer-readable storage medium on the user device 404 or coupled to the user device 404) that when executed by a computer system of the user device 404 enable user interaction with the document sharing and collaboration functionality provided by the computing resource service provider 410. As with a web application-based or a browser-based interface, the document management and collaboration application 464 enables the user to supply log in credentials and access one or more document directories or folders. The user may also interact that document management and collaboration system 406 provided by the computing resource service provider 410 by, for example, uploading a document to one or more folders, deleting a document from one or more folders, annotating an underlay for a document, viewing an overlay including annotations, among others). The document management and collaboration application 464 may provide a mechanism for utilizing any document collaboration and management resources and functionalities that is independent of the web application 462.

The document management and collaboration application 464 includes a synchronization client 466 that communications with the front-end system 412 and the document management and collaboration system 406. The synchronization client 466 may send or transmit requests on behalf of the user or based at least in part on the user's actions or interactions with the document management and collaboration system 406. For example, if the user navigates through one or more folder, annotates an overlay or instructs that a document is to be uploaded, the synchronization client 466 sends messages or requests to that effect to the front-end system 412 or the document management and collaboration system 406. The front-end system 412 or the document management and collaboration system 406 may, in turn, process and attempt to satisfy the requests. The synchronization client 466 may cause requests to be sent either synchronously or asynchronously in relation to a user's action. For example, if a user who is an administrator of an organization changes the permission privileges of a second user using a functionality provided by the document management and collaboration application 464, the synchronization client 466 may make a request (such as an API function call) synchronously in relation to the change of permission privileges made by the administrator.

The synchronization client 466 attempts to ensure that consistent views are maintained on the user's end and on the computing resource service provider's 410 end. Thus, the synchronization client 466 may also receive requests from the computing resource service provider 410 that affect the system view accessible to a user. The exchange of message, which may be API-configured function calls, results in a consistent view by the user of the system and the satisfaction of user requests. For example, when a user loses viewing privileges for a document, the synchronization client 466 of the user's device 404 receive a message to that effect and the document management and collaboration application 464 may cause the document to be dropped from the user's view.

Figure 5:
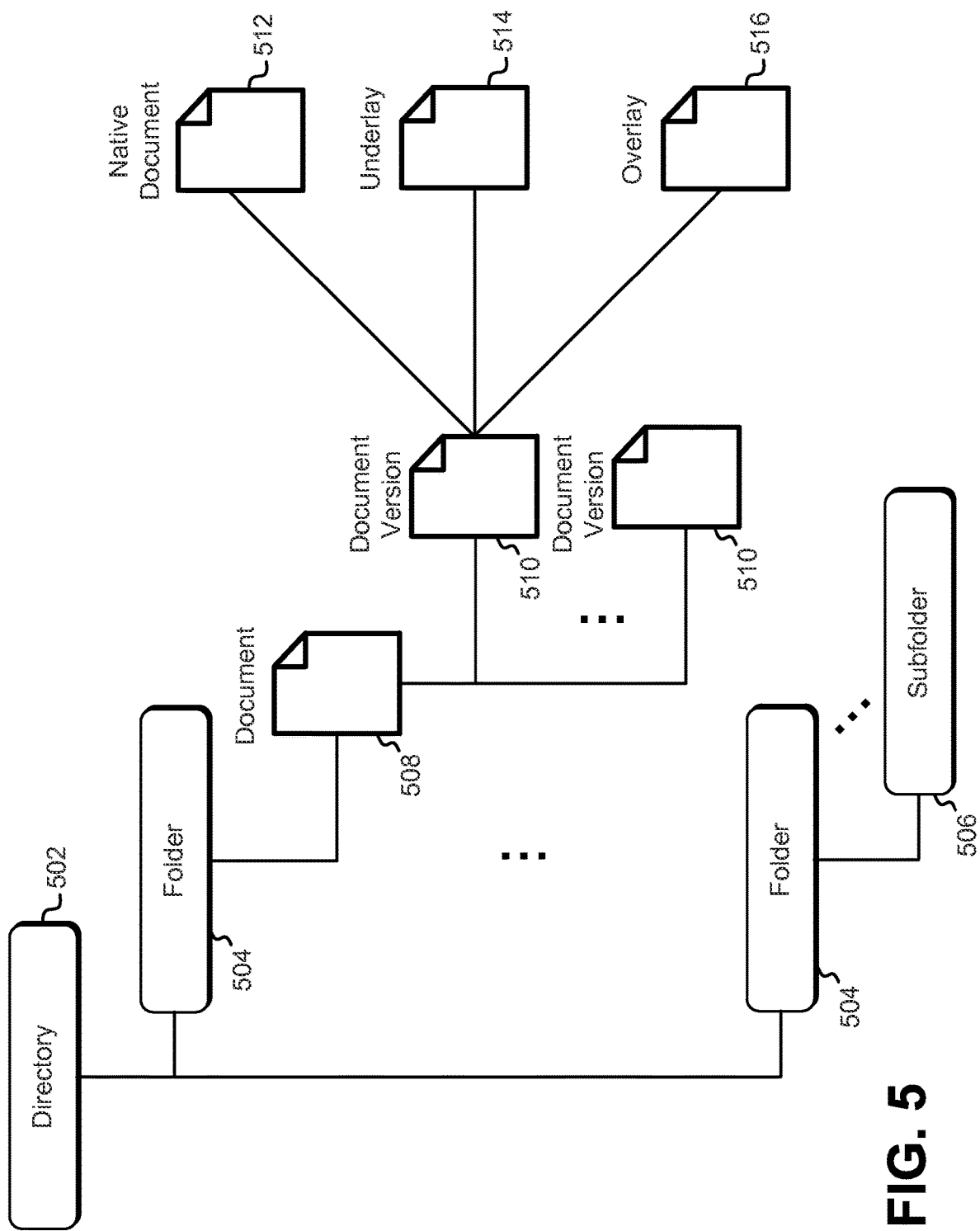
FIG. 5 shows an example of directory structure in accordance with at least one embodiment.

FIG. 5 shows an example of directory structure in accordance with at least one embodiment. A directory 502 may be maintained by a managed directory service and may be associated with an organization, which may, in turn, have one or more directories 502. As shown in FIG. 2, the directory 502 is shown to include one or more folders 504 (singularly referred to herein as folder 504). Further, a folder 504 may include one or more subfolders 506 that are nested within the folder 504. As may be recognized, a subfolder 506 may further include one or more nested subfolders. A folder 504 may be a file structure within the directory 502 and, in some embodiments, the security or permission privileges associated with the folder 504 may apply to documents 508 within the folder 504 or subfolders 506 that are nested within the folder 504.

A folder 504 may retain one or more documents 508 (singularly referred to herein as document 508). As described with reference to FIG. 5, a document may include a plurality of document versions 510. A document version 510 may be one revision of a document 508 or a subsequent version or revision of an existing document including, for example, user modifications and changes. Further, the permission or security privileges provided with respect to a document may apply to the plurality of document versions 510 associated with the document 508. Each document version 510 may have a plurality of representations including a native document 512, an underlay 514 and an overlay 516. The native document 512 may be an originally uploaded document (for example, in a file format compatible with a productivity suite). An underlay 514 may be a portable representation of the native document 512 that may be rendered on a user device utilizing a web application or a document management and collaboration application. The techniques described herein may apply to any portable representation that may utilize a common format that is independent of application software, hardware or operating system and may encapsulate a complete description of a fixed layout of the document. In addition, an overlay may be a representation of annotations made by users and collaborators. For example, an overlay may include a representation of highlights or text commentary. Reference is made herein to co-pending U.S. patent application Ser. No. 14/077,195, filed concurrently herewith, entitled "HOMOGENOUS CAPTURE OF DOCUMENT INTERACTIONS" and co-pending U.S. patent application Ser. No. 14/077,201, filed concurrently herewith, entitled "CROSS-PLATFORM HOMOGENOUS DOCUMENT COLLABORATION" describing, among others, an overlay and an underlay.

It is noted that more than one document versions 510 may include the originally uploaded document as the native document 512. Although as described with reference to FIG. 5, a document 508 includes a plurality of versions 510, whereby each version 510 may include a plurality of representations, as used in various contexts herein, a document may be any one of the versions or any one of the representations. For example, as used herein a user uploaded document may be the native document and an annotation document may be the overlay. The organization structure shown in FIG. 5 may be rendered in various styles or formats on a user device utilizing a web application or a document management and collaboration application.

Figure 6:
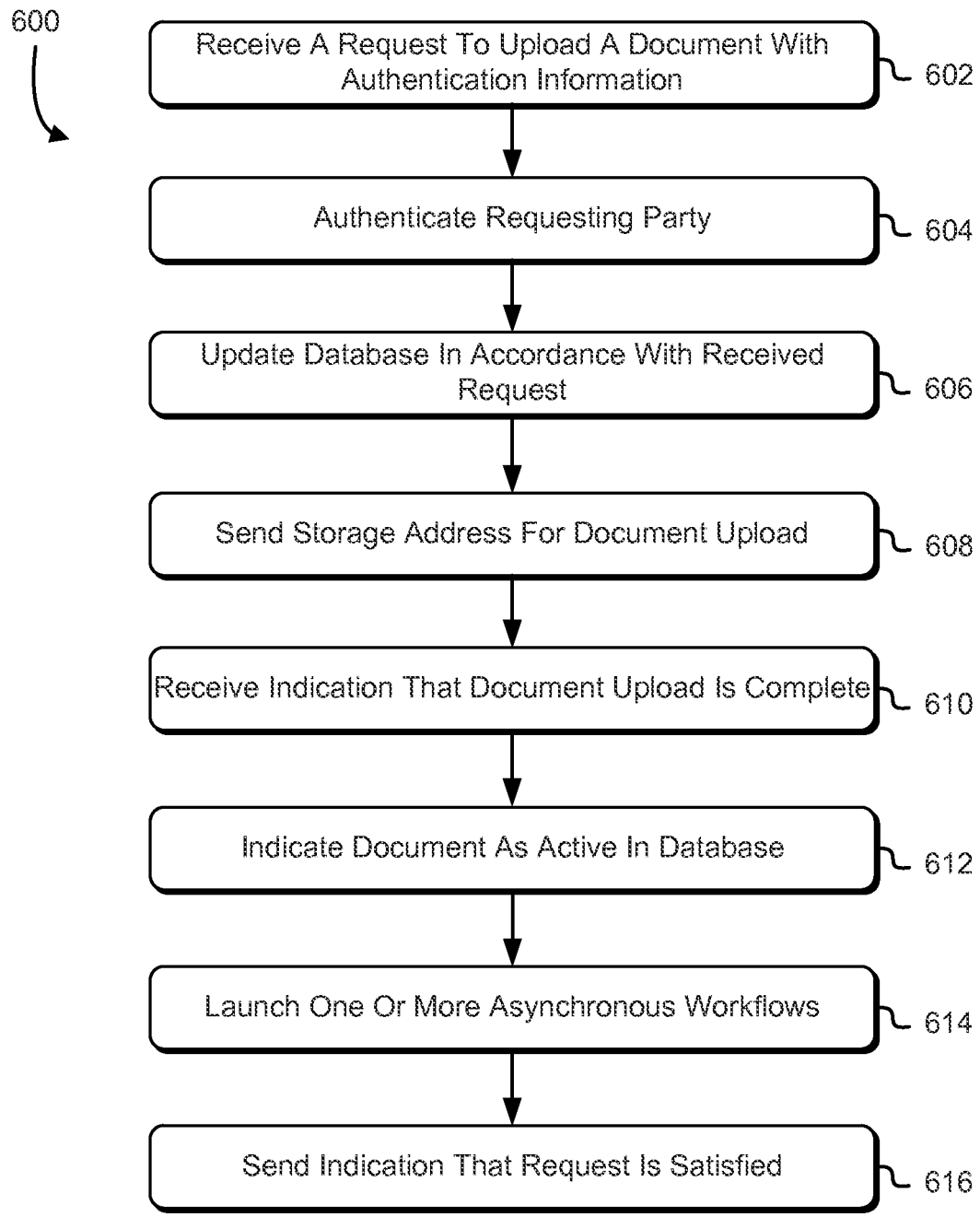
FIG. 6 shows an example of a method for uploading a document in accordance with at least one embodiment.

FIG. 6 shows an example of a method for uploading a document in accordance with at least one embodiment described herein. In the process 600, an application service, such as application service 334 of FIG. 3, receives 602 a request to upload a document. The document may be a new document or a new version of an existing document. Further, the document may be a native document. The request may be received from a user and may include authentication information associated with the user, such as an access or authorization token or log-in information. The authentication information is capable of being verified to confirm an identity associated with the requestor or to confirm that the requestor is genuine or that the identity presented by the requestor is genuine. Further, it may be confirmed that the requestor is authorized or permitted to request a document to be uploaded. A user may be permitted to upload or access a document by an administrator. Further, the user may be permitted to access a document by the administrator or by another user, document owner or other document principal. For example, the other user, document owner or other document principal may have privileges to share a document with users and may accordingly, utilize that privilege to enable users to access uploaded documents.

As described herein, the request may be an API configured function call. The application service then authenticates 604 the requesting party based at least in part on the provided authentication information. The application service may utilize the directory service authorization interface 354 for user authentication and may send the authentication information to the directory service authorization interface 354. The document management and collaboration system may rely on the managed directory service 222 for authentication, whereby the user's or organization's account with the managed directory service 222 may also be utilized for access to the services provided by the document management and collaboration system.

Upon receiving an indication that the requestor is authenticated, the application service updates 606 a database in accordance with the received request. Updating the database may include reserving a namespace for the document sought to be uploaded by, for example, creating an entry in the database for the document or associating the document with a folder, user, organization or group of users in the database. Further, the database may be updated to associate the document (for example, using a document identity) with a party. Whether the document sought to be uploaded is a new document or a new version of an existing document, the application service may cause the database to reflect the type of document. Updating the database may further include creating an entry associated with the document in the database. As described herein, the database may be executed or provided by the scalable database service 226.

The database may be used to store metadata associated with organizations, users, directories, documents and the like, whereas the document may be stored in the object-level data storage service 214. Accordingly, after updating the database with metadata associated with the document, the application service may determine a location or an address of where the document is to be stored in a data storage service. The address may pertain to or may be reserved for the document management and collaboration system and may be a uniform source locator (URL). The application service then sends 608 the storage address for document upload to the requestor. The address may be signed using any type of hashing or cryptographic technique. Upon receipt of the address and as described herein, the requestor may upload the document (for example, the native document) to the storage service and may send a message indicating that the document is uploaded to the application service and including authentication information.

The application service 610 receives the indication that document upload is complete. Further, the application service may receive authentication information with the request and may cause the authentication information to be verified to confirm the identity of the requestor. Further, the application service may confirm that the requestor is permitted to upload a document to the storage service. Upon completing the authentication or permission verification, the application service then indicates 612 the document as being active in the database. An active document may be a that is verified to be uploaded to the system, for example, by confirming that the party initiating upload of the document has permission to cause the document to be incorporated in the system. Further, an active document may be a user document that is available or ready for processing or available for retrieval by a user or a document system. In addition, the active document may one on which back-end processing, such as underlay generation or text extraction, may be performed.

Further, an active document may be a document that is successfully stored in a storage service or a document for which a confirmation of storage in the storage service has been received. It is noted that after the document becomes active, operations or workflows may be executed that utilize the document. Further, requests that utilize the document may be serviced and satisfied. Further, the application service launches 612 one or more asynchronous workflows for generating an underlay for the uploaded document or extracting document text and rendering the text searchable, among others. The asynchronous workflows may be completed by the asynchronous service as described herein. The workflows may be completed asynchronously and, accordingly, the application sends 616 a message to the requestor indicating satisfaction of request, which may be performed before completion of the asynchronous workflows. The extracted text may be stored in a storage service or a database and may be used to cause the document to be searchable, whereby the document may be identified based on one or more characters present in the document. The search functionality may be performed by a customer search service that may be capable of searching a portion or all of the documents in a directory to identify one or more documents or text portions thereof based at least in part on searched text. Further, the user may be provided with the option of searching the documents and may receive search results including one or more documents including text that matches the requested search query.

It is noted that as described in the process 600, the application service may perform certain actions, such as database updates and determining a storage location, synchronously in relation to a received request. Other operations, however, such as text extraction and underlay generation, may be performed asynchronously. The type of synchronous-to-asynchronous handoff, where some operations are delegated to an asynchronous engine, results in a more desirable user experience, whereby a user does not experience delays associated with the computationally-intensive operations or workflows asynchronously performed. Instead, the user may only encounter delays associated with certain operations, like user authentication, namespace reservation, truth table updates, storage address identification and transmittal and the like. In some embodiments, the operations that are performed synchronously may be required for the execution of the asynchronous workflows or operations.

Figure 7:
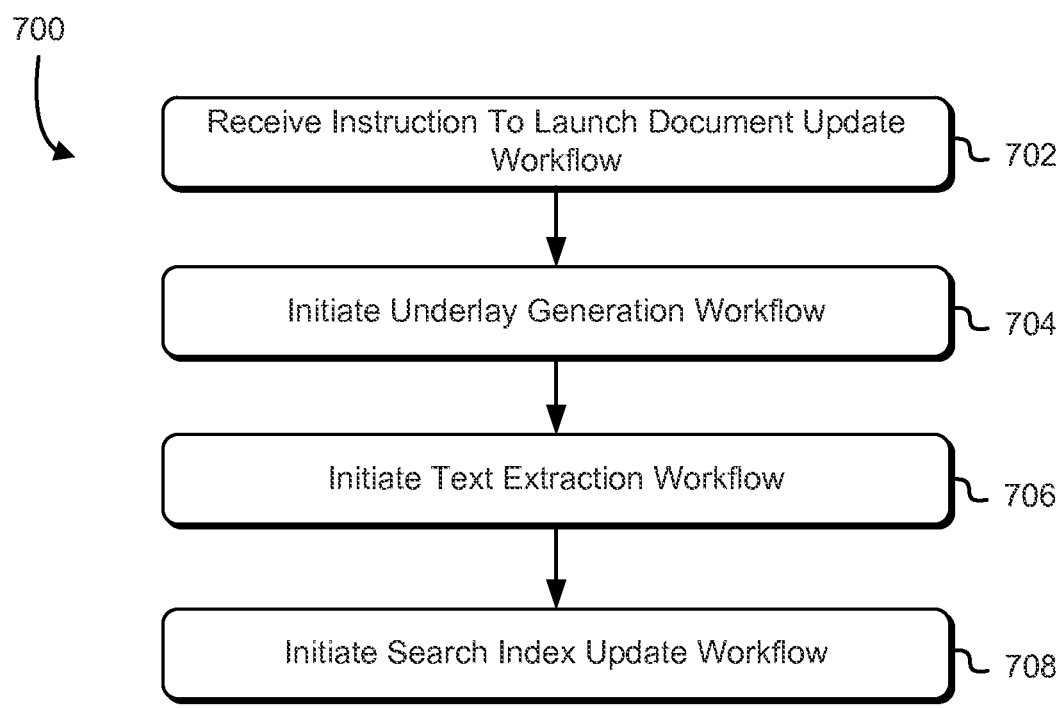
FIG. 7 shows an example of a method for performing asynchronous workflow for document upload in accordance with at least one embodiment.

FIG. 7 shows an example of a method for performing asynchronous workflow for document upload in accordance with at least one embodiment. The process 700 may be initiated due to the launch of one or more workflows by the application service as described with reference to FIG. 6. Further, the process 700 may be performed by the entities of the document management and collaboration system. The asynchronous service receives 702 an instruction from the application service to launch a document update workflow including a variety of operations as described herein. As a result, the master asynchronous engine initiates 704 underlay generation, which may include instructing the task management and workflow service to start underlay generation.

The underlay generation workflow may include obtaining the native document from the object-level data storage service and generating a representation of the native document in a portable format (also referred to herein as a common format and a universal format). The representation may be rendered using one or more applications on a client device. Examples of the representation may be a document having a portable representation file (pdf) format. Further, a thumbnail may be generated from the native document of the underlay. The underlay and the thumbnail may be uploaded for storage in the object-level data storage service. Furthermore, the underlay generation workflow may update a scalable database service to specify that a thumbnail and underlay have been generated for the native document or to specify the storage location of the underlay or the thumbnail. A virtual machine or virtual computing instance of the virtual computing service may be used to execute a portion of or all of the underlay generation workflow, whereby the virtual machine or virtual computing instance may be configured with any type of operating system and may execute one or more software package that are capable of performing underlay or thumbnail generation.

The master asynchronous engine then initiates 706 a text extraction workflow, which may include instructing the asynchronous search engine to perform text extraction. The asynchronous search engine may then retrieve the updated or new native document from the object-level data storage service and extract the text of the native document. The asynchronous search engine then creates an annotation index for the document, for example, as a JavaScript Object Notation (JSON) file, and uploads the extracted text and the annotation index to the object-level data storage service. The annotation index (also referred to herein as a coordinate map) may be created based at least in part on the document in the common format and the Cartesian coordinate system of the common format file. The annotations index may be used for displaying user selections and annotations in the uploaded document. In various embodiments, the coordinate map is maintained in a separate file from the document or underlay. Further, the coordinate map may be included as information in the document or underlay. For example, the coordinate map may be stored in the document converted to the common format. The coordinate map enables consistent display of the information contained in the overlay across multiple computing devices with different display characteristics, such as different resolutions, different display sizes, different aspect ratios and any other differences displays of the multiple devices. When used by the computing device to display the document, the coordinate causes the annotations to be displayed in connection with the same words regardless of the display characteristics of a particular display that displays the overlay and document. Reference is made herein to co-pending U.S. patent application Ser. No. 14/077,201, filed concurrently herewith, entitled "CROSS-PLATFORM HOMOGENOUS DOCUMENT COLLABORATION," describing, among others, coordinate map generation.

The asynchronous search engine may indicate to the search service, for example, the search service described with reference to numeral 344 in FIG. 3, that search index update may commence and the search index update may be queued for processing. The search service then initiates 708 a search index update workflow. The service may be capable of performing batch processing and may retrieve a batch of index updates from a queue and launch the search index update workflow. The asynchronous search engine updates a customer search service indices with a document batch.

The document management and collaboration system may be integrated with or utilized in conjunction with other services, such as a virtual desktop service that enables users to execute one or more virtual desktops using distributed computing resources. For example, the various file or document directories of the virtual desktop may be maintained by the document management and collaboration system. Using the document management and collaboration system, a user may be able to access various document directories of their virtual desktop or virtual operating system. The access may be performed without a need to independently access the virtual desktop or operating system or the virtual desktop service. Accordingly, when the document management and collaboration system is integrated with virtual desktop service, the directories, documents or folders maintained by the virtual desktop service may be accessible via the document management and collaboration system.

Further, the document management and collaboration system may be utilized for storing documents and directories for the virtual desktop service. Further, in some embodiments, the document management and collaboration system may be responsible for storing desktop documents whereas the virtual desktop service may be responsible for storing other file types, such as software applications, private e-mails, user settings and the like. In some embodiments, security privileges may be shared between the document management and collaboration system and the virtual desktop service, whereby a user may sign on to both systems with a single sign-on and utilizing a single authentication process.

Figure 8:
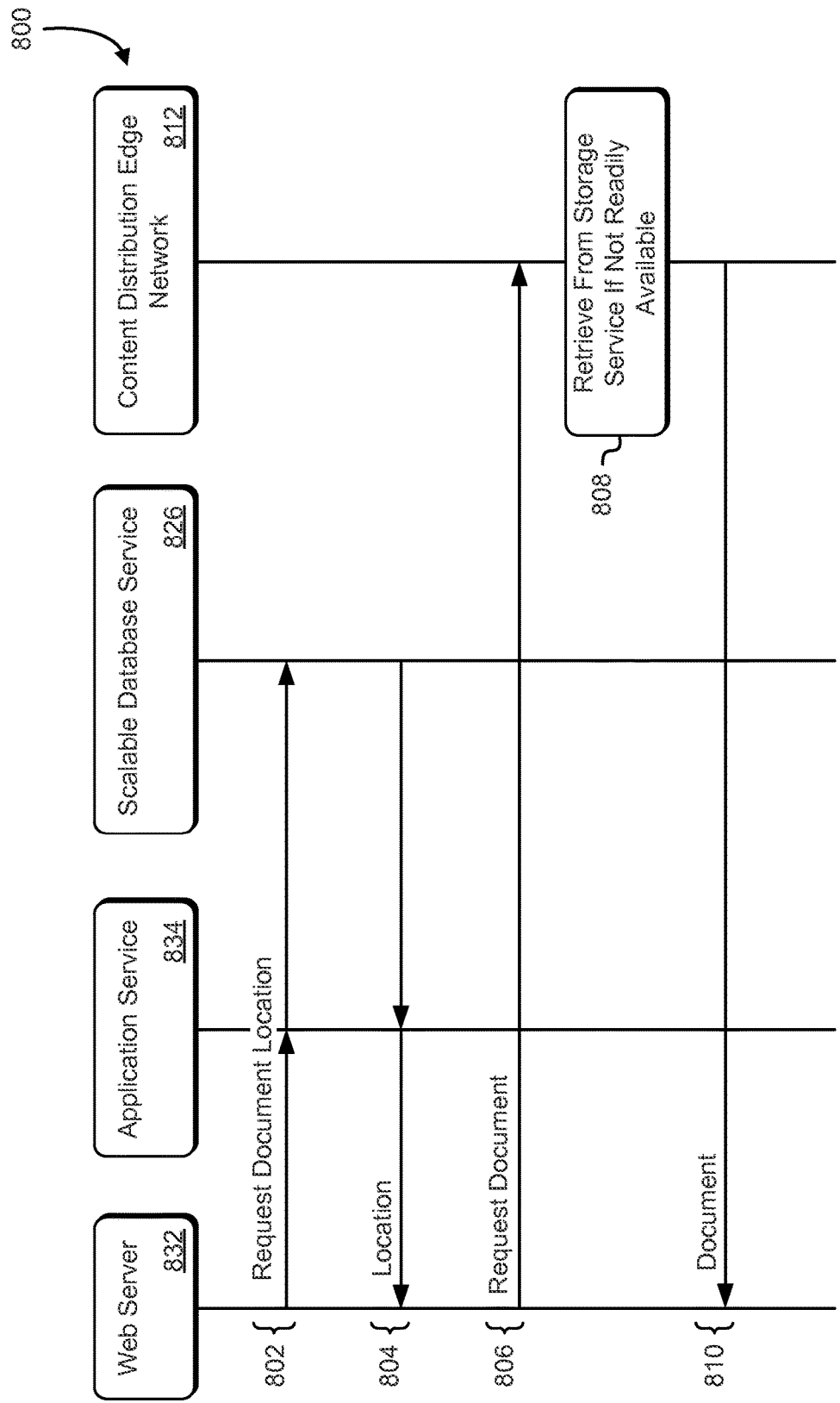
FIG. 8 shows an example of a method for document retrieval in accordance with at least one embodiment.

FIG. 8 shows an example of a method for document retrieval in accordance with at least one embodiment. In the process 800, a web server 832 requests 802 document location from an application service 834. The web server 832 may initiate the request due to receipt of a second request from a client device to view the document. As described with reference to FIG. 8, the document may be a thumbnail of an original document, an underlay or an original document, among others. As described herein, the document may be stored in a storage service and metadata associated with the document, such as storage address information, or may be stored in a database. Upon receiving the request, the application service 834, in turn, requests the document location from a scalable database service 826. The scalable database service 826 may retrieve the location of the document based at least in part on a document identity or another identifier. The scalable database service 826 provides 804 the location of the document to the application service 834, which, in turn, forwards 804 the location to the web server 832.

The web server 832 requests 806 the document from the content distribution edge network 812 based at least in part on the received location, which may be a URL. Further, when requesting the document, the web server may provide user authentication information, such as an access token, to be used to authenticate the user or verify that the user is authorized to receive the document. The content distribution edge network 812 may cause the user to be authenticated as described herein and may retrieve 808 the document from a storage service if the document is not readily available. The content distribution edge network 812 then sends 810 the document to the web server 832. The web server 832 may cause the document to be provided to a user device, where the document may be rendered to be viewed or edited by the user.

Upon authentication, a user device or a synchronization engine of the user device may determine if a desired document, such as an overlay or underlay, is up-to-date or is the latest version by communicating with the application service, for example, via appropriately configured API function calls. If it is determined that a later version or revision of the document is available the user device or synchronization engine may attempt to retrieve the version from the counterpart user device, whereby the counterpart user device may be a device of another user or a peer with whom the user collaborates on the document, for example, by annotating the document and sharing the annotations. Further, the user device may attempt to retrieve the later version from the storage service holding the document, for example, via the content edge distribution network. The user may be required to provide authentication credentials before being able to retrieve the document, which may be performed by signing a URL with the user's access permission.

Figure 9:
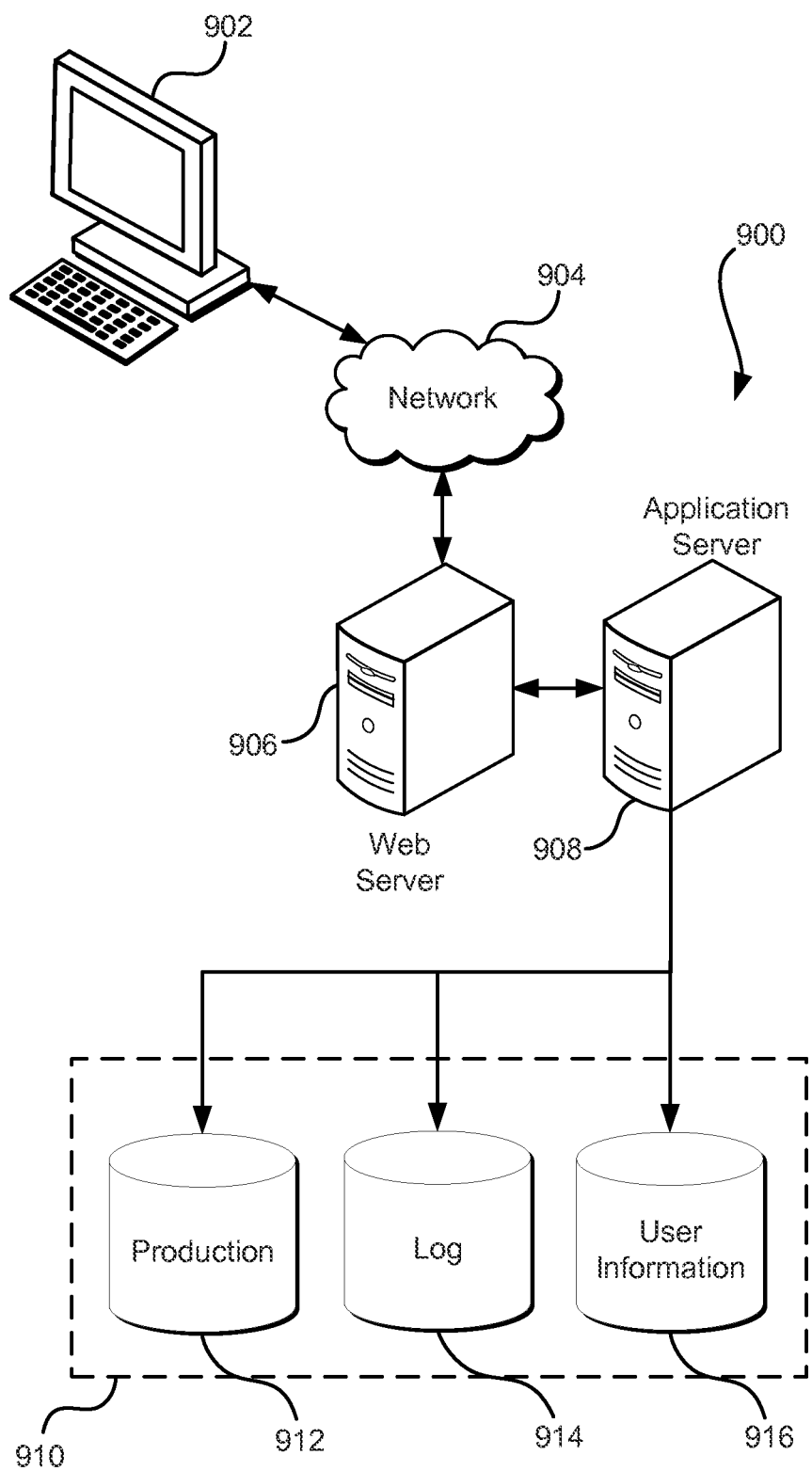
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   obtaining an application programming interface (API) request to upload a document to a document management and collaboration system;
   reserving a storage location for the document with a storage service, the reserving being performed synchronously in relation to the received request;
   providing an address of the storage location to a synchronization client executed by a computer system distinct from the document management and collaboration system, wherein the address of the storage location is cryptographically signed;
   obtaining an indication of successful storage of the document in the storage service;
   updating a database to indicate that the document is available for processing;
   upon the document becoming available for processing, obtaining additional API requests to generate an extracted text and an underlay associated with the document, the extracted text based at least in part on textual data included in the document, the underlay being a portable representation format of the document;
   delegating one or more operations to be performed asynchronously, wherein the one or more operations include at least one of text extraction and underlay generation;
   storing the underlay and metadata associated with the underlay, wherein metadata comprises information about the document and one or more users of the document;
   causing the extracted text to become usable for identifying the document; and
   servicing a request to access the document based at least in part on the identification of the document.

2. The computer-implemented method of claim 1, wherein:
the request to upload the document is received from a user device; and
the indication of successful storage is received from the user device in response to sending, to the user device, a resource locator identifying the storage location for the document in the storage service.

3. The computer-implemented method of claim 1, wherein:
the request to upload the document is associated with authorization information associated with a user; and
the method further comprises verifying that the user is granted a permission to upload the document.

4. The computer-implemented method of claim 3, further comprising:
storing, in the database, an indication of a storage location of the underlay; and
upon receiving a user-initiated request to access the underlay, retrieving the storage location from the database and causing the storage location to be provided to the user.

5. The computer-implemented method of claim 1, further comprising:
receiving a request to upload a subsequent version of the document; and
causing the database to associate the document with the subsequent version of the document.

6. The computer-implemented method of claim 5, further comprising:
in response to the subsequent version of the document being received, cause a subsequent underlay associated with the subsequent version of the document to be generated.

7. The computer-implemented method of claim 1, further comprising:
receiving one or more API requests to determine whether the underlay of the document is the latest version before servicing the request to access the document.

8. A system, comprising one or more computing devices collectively configured to implement at least an application service to at least:
obtain an application programming interface (API) request to upload a document to a document management and collaboration system;
reserve a storage location for the document with a storage service, the reserving being performed synchronously in relation to the obtained request;
obtain, over a network, the document;
as a consequence of receipt of the document, cause an underlay and extracted text to be generated for the document, the underlay being a common format of the document and the extracted text based at least in part on information contained in the document;
delegate one or more operations to be performed asynchronously, wherein the one or more operations include at least one of text extraction and underlay generation;
store the underlay and metadata associated with the underlay, wherein metadata comprises information about the document and one or more users of the documents;
obtain a request for access to the document, the request being initiated by a user; and
in response to the request for access to the document, cause the underlay and a coordinate map associated with the underlay to be provided.

9. The system of claim 8, wherein:
the document is received for incorporation into a folder of one or more folders of a document directory; and
the application service is further configured to cause the document to be associated with at least the folder, the document directory and one or more users having permission to access the document.

10. The system of claim 8, wherein the application service is further configured to:
receive a request to upload the document;
send an indication to the synchronization client of the storage location for document storage; and
receive a message from the synchronization client indicating successful storage of the document at the storage location.

11. The system of claim 10, wherein:
the application service is further configured to, upon receiving the message, cause a database to indicate that the document is active; and
the document is capable of being utilized to generate the underlay upon becoming active.

12. The system of claim 8, wherein the one or more computing devices are collectively configured to further implement a computing service configured to generate the underlay by:
retrieving the document from the storage service;
generating the underlay based at least in part on the document; and
causing the underlay to be stored in the storage service.

13. The system of claim 8, wherein the application service is further configured to:
receive a request to incorporate a subsequent version of the document in one or more folders of a document directory; and
render the subsequent version of the document in the common format.

14. The system of claim 8, wherein:
the request for access to the document is associated with user authorization information; and
the application service is further configured to verify the user is granted a permission to access the document.

15. A non-transitory computer-readable storage medium comprising collectively stored thereon executable instructions that, as a result of being executed by one or more processors of a computer system, cause the computer system to at least:
obtain an application programming interface (API) request to upload a document to a document management and collaboration system;
reserve a namespace for the document synchronously in relation to receipt of the document;
after the document is stored in a storage system, cause one or more workflows to be launched, the one or more workflows, upon successful execution, causes a universal representation underlay and extracted text to be generated based at least in part on the document and causes the universal representation underlay and metadata associated with the underlay to be stored in the storage system;
delegate one or more operations to be performed asynchronously, wherein the one or more operations include at least one of text extraction and underlay generation;
obtain a request to collaborate on the document, the request being initiated by a user with a privilege to collaborate on the document; and
in response to the request, send an indication of a storage address of the universal representation underlay in the storage system for retrieval.

16. The non-transitory computer-readable storage medium of claim 15, wherein the instructions that cause the computer system to receive the document further include instructions that cause the computer system to:
- receive, from the synchronization client, a request to upload the document to the storage system;
- send, to the synchronization client, an indication to store the document in the storage system; and
- receive, from the synchronization client, an indication that the document is successfully stored in the storage system.

17. The non-transitory computer-readable storage medium of claim 16, wherein:
- the request to upload the document is associated with authorization information associated with the user; and
- the instructions further comprise instructions that, as a result of being executed by the one or more processors, cause verifying that the user is granted a permission to upload the document.

18. The non-transitory computer-readable storage medium of claim 15, wherein the instructions further comprise instructions that, as a result of being executed by the one or more processors, cause the computer system to write to a database an indication that the document is active or capable of being retrieved for generating the universal representation underlay.

19. The non-transitory computer-readable storage medium of claim 15, wherein the instructions further comprise instructions that, as a result of being executed by the one or more processors, cause the computer system to:
- receive a request to incorporate a subsequent version of the document in a document directory; and
- cause one or more additional workflows to be initiated, the one or more additional workflows, upon successful execution, enabling the subsequent version of the document to be rendered using a second universal representation underlay.

20. The non-transitory computer-readable storage medium of claim 15, wherein the instructions further comprise instructions that, as a result of being executed by the one or more processors, cause the computer system to:
- receive authentication information associated with a user; and
- cause the user to be authenticated based on the authentication information.

21. The non-transitory computer-readable storage medium of claim 15, wherein the instructions that cause the computer system to reserve the namespace for the document further include instructions that, as a result of being executed by the one or more processors, cause the computer system to instruct a database to associate the document with a directory, one or more folders or one or more users.

22. The non-transitory computer-readable storage medium of claim 15, wherein the document is received for incorporation by the document collaboration and management service from the user via a folder of one or more folders of a document directory.

* * * * *